S. Pratt.
Wood Screws and Spike.
Nº 10,171.  Patented Oct. 25, 1853.
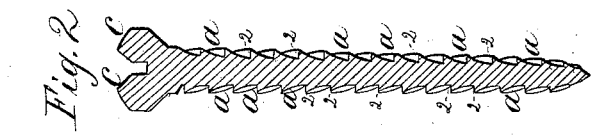
 
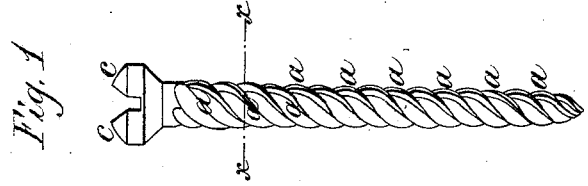

UNITED STATES PATENT OFFICE.

SAMUEL PRATT, OF BOSTON, MASSACHUSETTS.

IMPROVEMENT IN SCREW-NAILS.

Specification forming part of Letters Patent No. 10,171, dated October 25, 1853.

*To all whom it may concern:*

Be it known that I, SAMUEL PRATT, of Boston, in the county of Suffolk and State of Massachusetts, have invented a new and useful Screw Nail and Spike, of which the following is a full, clear, and exact description, reference being had to the accompanying drawings of the same, which make part of this specification, in which—

Figure 1 represents a side elevation; Fig. 2, a longitudinal section of one of my screw-spikes; Fig. 3, a plan of the head, and Fig. 4 a horizontal section at the line $x\,x$.

The object of my invention is to construct a spike or nail in such manner that it may be turned into the wood by driving and out by means of a turn-screw without having its head bruised by the driving, so as to prevent the proper application of the turn-screw and without breaking the wood by the driving, so as to prevent it from forming a good and compact counter-screw for the threads of the nail to turn in. The inclination of the threads of a screw like this must be such that the angle will be sufficiently acute to cause it to penetrate the wood freely and at the same time not so acute as to prevent it from being turned out by a screw-driver. A very good angle is that shown in the drawings. The angle of the thread is usually so oblique to the axis of the nail that it requires several threads to cover the shank—in the present example five—each of which forms a helix of a quarter of an inch exterior diameter with one turn of the thread every three-quarters of an inch. The outline of the upper face 2 of the thread $a$ in its radial cross-section is a straight line and at right angles to the axis of the shank; but the under side of the thread forms a very oblique angle with the axis, and it is curved so as to leave a large space between the threads of the nail, which being of metal are comparatively strong, that the wooden thread into which they are turned, and which is of comparatively weak material, may be as large as possible. This curvature leaves the inclination of the under side of the thread such as will allow it to penetrate the wood freely when driven. If the nick of the head were of the usual form with its corners on a level with the crown of the head, the blows of the instrument employed for driving it would batter it so that it would be wholly or partially closed, which would prevent the entrance of the blade of the screw-driver to turn it out. To obviate this difficulty I remove the corner $c$ of the nick so that the blows of the driving-hammer will fall upon the middle of the part on each side of the nick, which may be battered to any extent required in driving it into the hardest wood without in any way obstructing the nick or the application of a turn-screw.

The manifold modifications which may be made in the screw nail and spike without in any way departing from the principle of my invention are obvious, and therefore I will not describe them, and so the uses and advantages of the article are also too obvious to require specification.

What I claim as my invention, and desire to secure by Letters Patent, is—

1. A screw-nail constructed with a thread shaped substantially as herein described.

2. Shaping the head, substantially as herein set forth, so that the battering caused by the driving will not obstruct the application of the turn-screw.

In testimony whereof I have hereunto subscribed my name this 10th day of June, A. D. 1853.

SAMUEL PRATT.

Witnesses:
IRA GOODRICH,
JAMES DYEN.